(12) United States Patent
Cornwall et al.

(10) Patent No.: US 7,400,904 B2
(45) Date of Patent: Jul. 15, 2008

(54) DUAL MODE AM-FM RECEIVER WITH I-Q DECODING, SUCH AS FOR UTILITY DATA COLLECTION

(75) Inventors: Mark K. Cornwall, Spokane, WA (US); Bruce N. Weyrauch, Spokane Valley, WA (US); Jeffrey L. Delamater, Liberty Lake, WA (US)

(73) Assignee: Itron, Inc., Liberty Lake, WA (US)

( * ) Notice: Subject to any disclaimer, the term of this patent is extended or adjusted under 35 U.S.C. 154(b) by 532 days.

(21) Appl. No.: 11/096,269

(22) Filed: Mar. 30, 2005

(65) Prior Publication Data

US 2006/0121862 A1 Jun. 8, 2006

Related U.S. Application Data

(60) Provisional application No. 60/633,007, filed on Dec. 3, 2004, provisional application No. 60/633,089, filed on Dec. 3, 2004.

(51) Int. Cl.
*H04M 1/00* (2006.01)
*H04B 7/08* (2006.01)
*H03D 3/00* (2006.01)

(52) U.S. Cl. .............. 455/552.1; 455/553.1; 455/132; 455/334; 375/334; 375/335

(58) Field of Classification Search .............. 455/522.1, 455/553.1, 132, 334; 375/334, 335
See application file for complete search history.

(56) References Cited

U.S. PATENT DOCUMENTS

| | | | |
|---|---|---|---|
| 3,206,680 A | 9/1965 | Mason | |
| 3,665,507 A | 5/1972 | Peil | |
| 3,745,467 A | 7/1973 | Lundquist et al. | |
| 3,919,645 A | 11/1975 | Ohsawa et al. | |
| 3,971,988 A | 7/1976 | Denenberg | |
| 4,001,702 A | 1/1977 | Kaufman | |
| 4,070,628 A | 1/1978 | Funabashi | |
| 4,304,004 A | 12/1981 | von der Neyen | |
| 4,322,842 A * | 3/1982 | Martinez | 370/204 |
| 4,517,562 A * | 5/1985 | Martinez | 340/825.52 |
| 4,599,743 A | 7/1986 | Reed | |
| 4,660,192 A * | 4/1987 | Pomatto, Sr. | 370/204 |
| 4,677,690 A | 6/1987 | Reed | |
| 4,910,521 A * | 3/1990 | Mellon | 342/45 |
| 5,615,302 A * | 3/1997 | McEachern | 704/209 |
| 5,633,896 A * | 5/1997 | Carlin et al. | 375/340 |
| 5,767,780 A * | 6/1998 | Smith et al. | 340/648 |
| 5,787,362 A | 7/1998 | Matero | |
| 5,850,415 A * | 12/1998 | Hunsinger et al. | 375/216 |
| 6,219,385 B1 * | 4/2001 | Weinberg | 375/259 |
| 6,487,399 B1 * | 11/2002 | Rajaniemi et al. | 455/226.1 |
| 6,636,747 B2 * | 10/2003 | Harada et al. | 455/552.1 |

(Continued)

FOREIGN PATENT DOCUMENTS

WO  PCT/US2005/011205  3/2005

*Primary Examiner*—Duc M Nguyen
(74) *Attorney, Agent, or Firm*—Perkins Coie LLP

(57) ABSTRACT

Methods and apparatus demodulate and decode a plurality of AM and FM arriving signals, which permit, for example, a utility data-collecting unit to concurrently receive and decode transmitted signals of legacy transmitters as well as more recent FM based transmitters, or signals arriving from hybrid systems configured to transmit both AM and FM.

28 Claims, 5 Drawing Sheets

U.S. PATENT DOCUMENTS

| | | | |
|---|---|---|---|
| 6,640,093 B1 * | 10/2003 | Wildhagen | 455/130 |
| 6,658,267 B1 * | 12/2003 | Baranowski et al. | 455/556.1 |
| 6,678,512 B1 * | 1/2004 | Kaminski et al. | 455/334 |
| 6,762,642 B2 | 7/2004 | Khorram | |
| 7,106,809 B2 * | 9/2006 | Whikehart et al. | 375/316 |
| 7,133,646 B1 * | 11/2006 | Miao | 455/73 |
| 7,149,238 B2 * | 12/2006 | Agee et al. | 375/141 |
| 7,184,726 B2 * | 2/2007 | Shibata | 455/179.1 |
| 7,187,906 B2 * | 3/2007 | Mason et al. | 455/69 |
| 7,218,696 B2 * | 5/2007 | Smith et al. | 375/356 |
| 7,257,406 B2 * | 8/2007 | Ji | 455/450 |
| 7,262,709 B2 * | 8/2007 | Borleske et al. | 340/870.02 |
| 2003/0198302 A1 | 10/2003 | Song | |
| 2005/0227626 A1 * | 10/2005 | Stoddard et al. | 455/67.11 |
| 2008/0001779 A1 * | 1/2008 | Cahill-O'Brien et al. | 340/870.03 |

\* cited by examiner

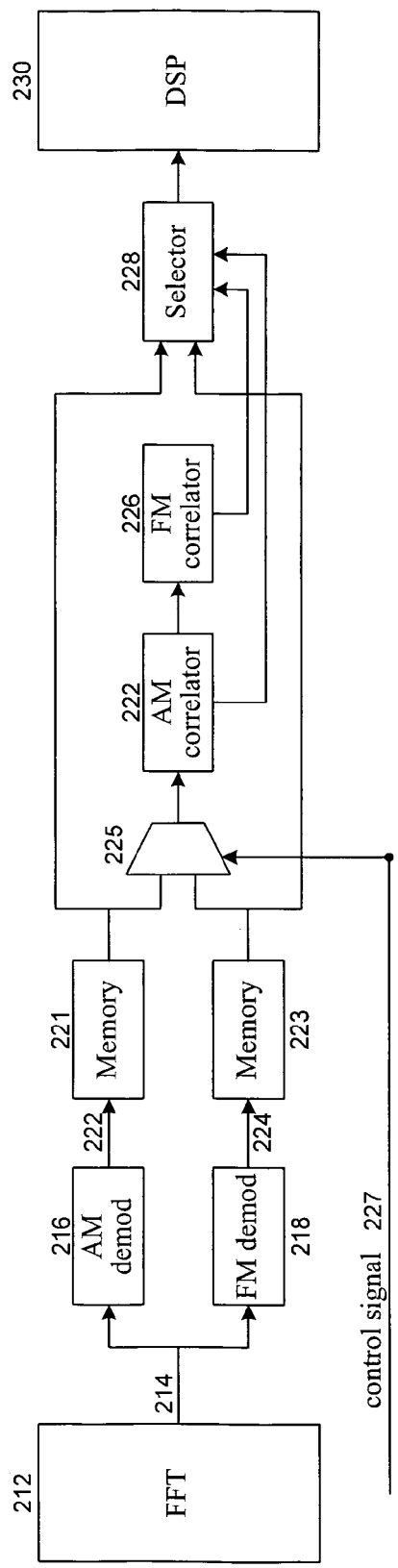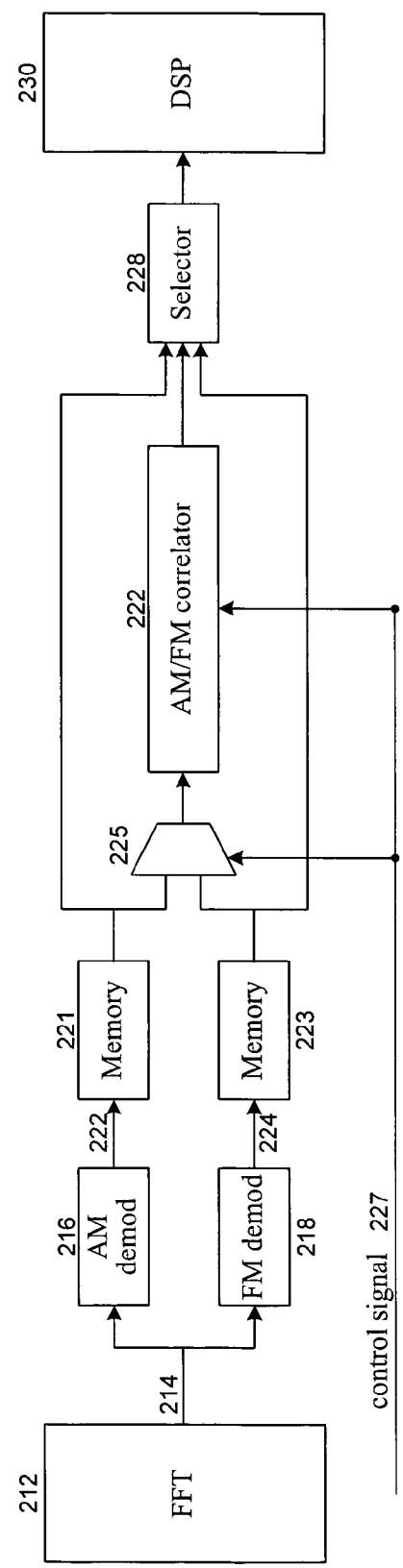

DUAL MODE AM-FM RECEIVER WITH I-Q DECODING, SUCH AS FOR UTILITY DATA COLLECTION

CROSS-REFERENCE TO RELATED APPLICATION(S)

This application claims the benefit of U.S. Provisional Patent Application Nos. 60/633,007 and 60/633,089 filed on Dec. 3, 2004, both of which are incorporated herein by reference.

TECHNICAL FIELD

The embodiments described below relate generally to wireless communication systems, and more particularly, relate to simultaneous demodulation and decoding of amplitude-modulated (AM) and frequency-modulated (FM) signals in a utility data collection system.

BACKGROUND

Historically meter readings of the consumption of utility resources such as water, gas, or electricity have been accomplished manually by human meter readers at customers premises. The relatively recent advances in this area include collection of data by telephone lines, radio transmission, walk-by, or drive-by reading systems using radio communications between the meters and meter reading devices. Although some of these methods require close physical proximity to the meters, they have become more desirable than the manual reading and recording of the consumption levels. Over the last few years, there has been a concerted effort to automate meter reading by installing fixed networks that allow data to flow from the meter to a host computer system without human intervention. These systems are referred to in the art as Automated Meter Reading (AMR) systems.

A mobile AMR system comprises an Encoder-Receiver-Transmitter (ERT), which is a meter interface device attached to the meter and either periodically or in response to a request transmits utility consumption data. Today, some ERTs transmit AM, while others transmit FM signals. In other fields, there are systems configured to receive both types of signals concurrently. For example in the automotive field, radio receivers possessing both AM and FM reception are common.

The Kaufman (U.S. Pat. No. 4,001,702), Funabashi (U.S. Pat. No. 4,070,628), von der Neyen (U.S. Pat. No. 4,304,004), Mason (U.S. Pat. No. 3,206,680), Peil (U.S. Pat. No. 3,665,507), Lundquist et al (U.S. Pat. No. 3,745,467), Ohsawa et al. (U.S. Pat. No. 3,919,645) and Denenberg (U.S. Pat. No. 3,971,988) patents are all radio receivers capable of receiving AM and FM signals; however, most automotive radio receivers, such as the ones of Funabashi, Mason, Peil, Lundquist et al, Ohsawa et al, and Denenberg receive AM and FM signals as alternatives and merely allow the user to select between the two signals. As such, two kinds of traditional receivers are required for demodulation and decoding of the two possible transmission types, which complicates the required hardware, entails extra cost, etc.

BRIEF DESCRIPTION OF THE DRAWINGS

FIGS. 5 and 6 are two alternative embodiments to the receiver of FIG. 2.

DETAILED DESCRIPTION

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section. In the following description, several specific details are presented to provide a thorough understanding of the embodiments of the invention. One skilled in the relevant art will recognize, however, that the invention can be practiced without one or more of the specific details, or in combination with or with other components, etc. In other instances, well-known implementations or operations are not shown or described in detail to avoid obscuring aspects of various embodiments of the invention. Even though different aspects of this invention are mostly presented in the context of utility data collection, they can be applied to any AM and FM receiving system, and the description of the invention is not intended to limit its applicability to any particular field of usage.

Suitable System

Figure 1:
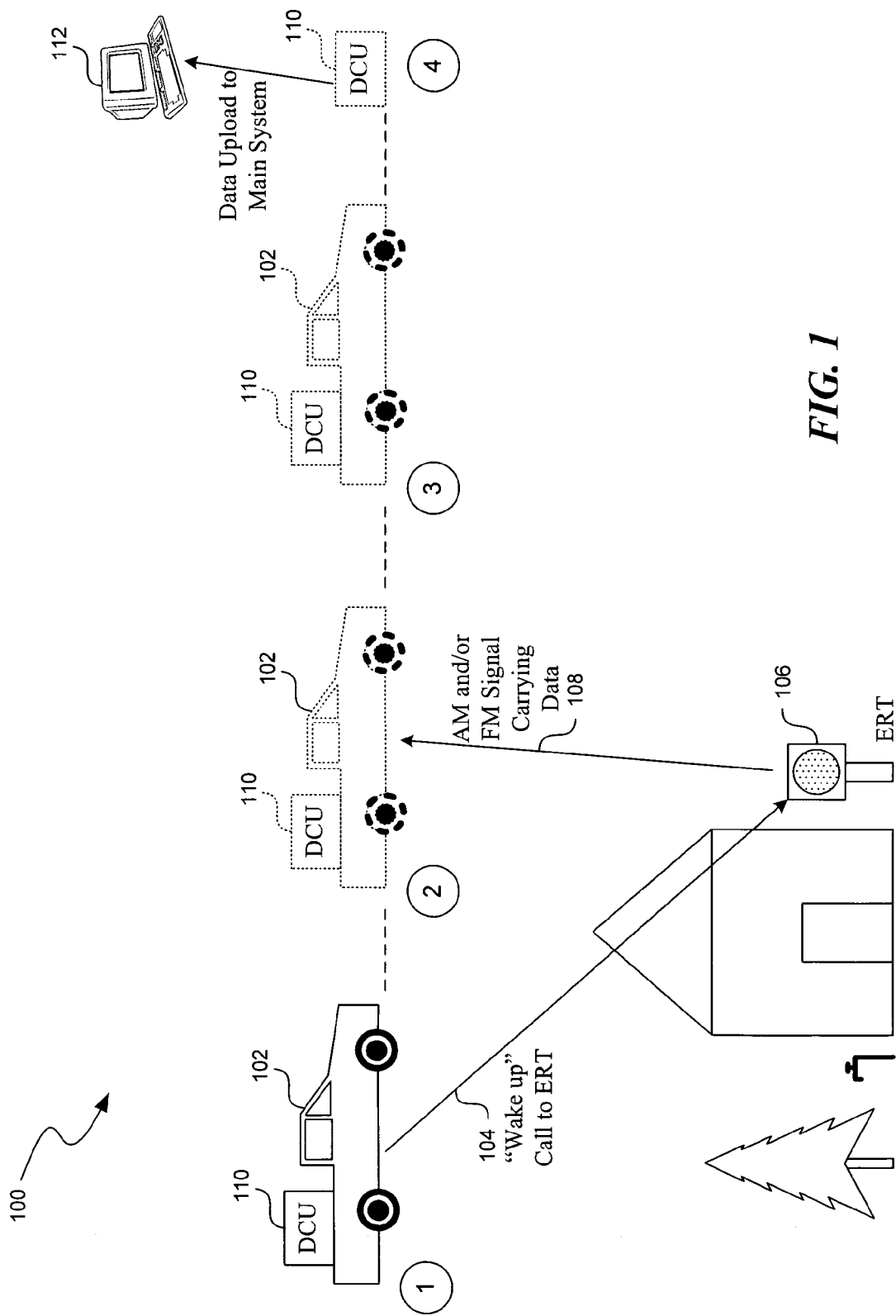
FIG. 1 illustrates the basic elements and processes of a mobile AMR system that may employ aspects of the invention.

FIG. 1 illustrates the basic elements and processes of a mobile AMR system 100. The mobile AMR system 100 consists of three basic components: an Encoder-Receiver-Transmitter (ERT) 106, a Data Collection Unit (DCU) 110, and AMR Software. The ERT 106 is a meter interface device attached to the meter, which either periodically transmits utility consumption data 108 ("bubble-up" ERTS), or receives a "wake up" polling signal or a request 104 for its meter information from a transceiver mounted in a passing vehicle 102 or carried by the meter reader. The ERT 106, in response to a wake-up signal 104, broadcasts the meter number, the meter reading, and other information to the DCU 110, which is a mobile computer, for example, in the meter reading vehicle 102. The DCU 110 collects the information from the ERTs 106 for subsequent uploading into the AMR Software system. The AMR Software interfaces with the main system 112 and updates the appropriate accounts of the billing system with the new meter readings.

Dual AM-FM Decoding

As described in detail below, the AMR system 100 provides for simultaneous demodulation and decoding of both amplitude-modulated (AM) and frequency-modulated (FM) signals by the Data Collection Unit (DCU) 110. Demodulating and decoding both kinds of signals arise, for example, as a result of some endpoint Encoder-Receiver-Transmitters (ERTs) broadcasting utility data through AM signals, while newer ERT endpoints transmit meter readings via FM signals.

The need for demodulation and decoding of both kinds of signals also arises as a result of simultaneous transmission of both signals by a hybrid system which is configured to broadcast both AM and FM signals. As long as both transmission methods coexist and are in use, the DCU 110 can easily, efficiently, interchangeably or simultaneously decode signal types. The prior art has addressed this problem by merely employing separate AM and FM receivers.

The embodiments of this invention utilize the frequency spectrum of an arriving signal to identify its modulation type, to demodulate the data, and to direct the demodulated data to an appropriate path for decoding. For the purpose of demonstration, the examples presented in this application employ the output of an FFT (Fast Fourier Transform) process as the basis for identifying, demodulating and decoding an arriving signal. While not requiring traditional dedicated narrow-band FM receiver to decode FM data, the embodiments of this invention utilize an FFT engine to decode FM data in a channelized radio.

Figure 2:
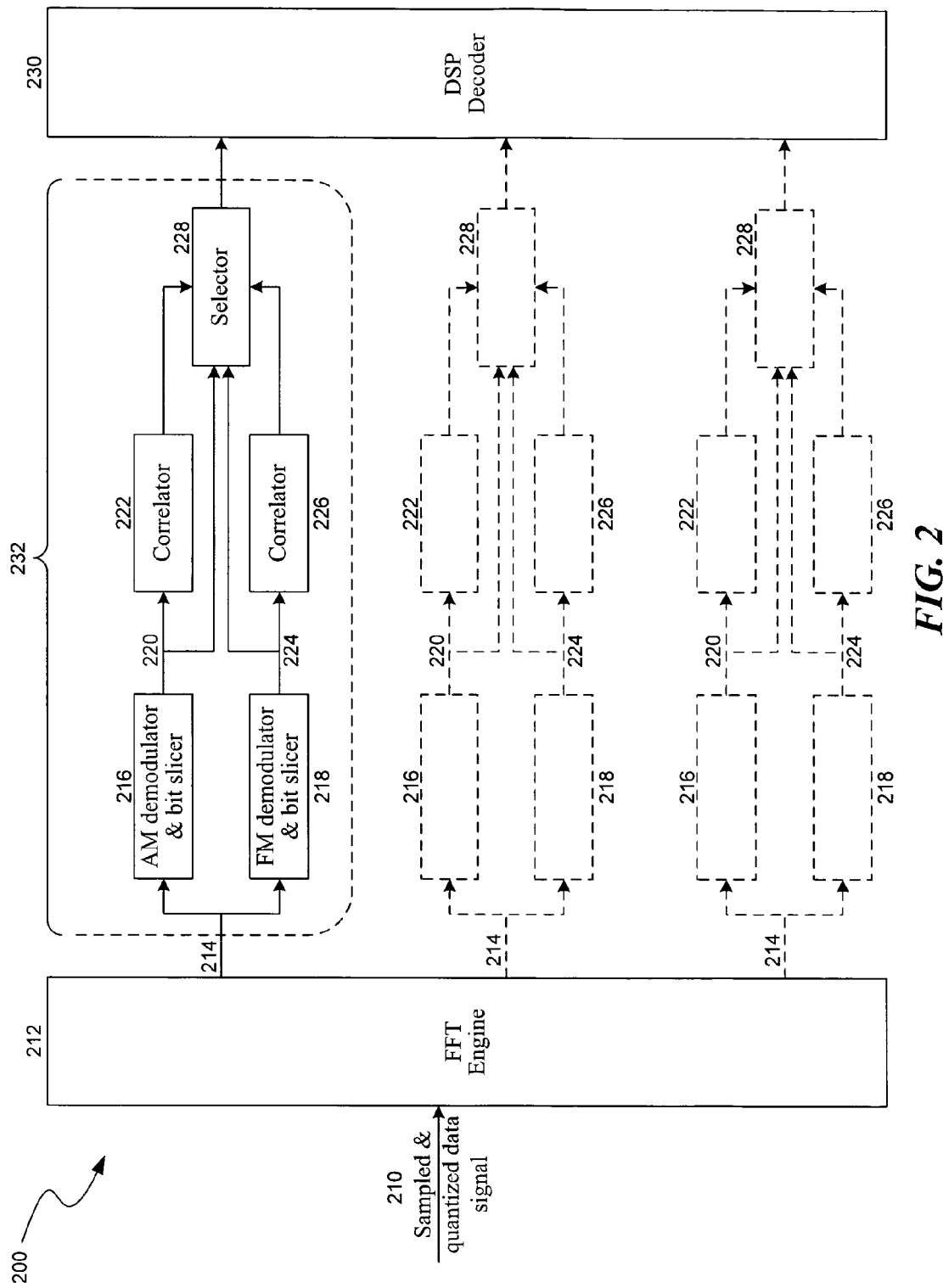
FIG. 2 is a high level block diagram of elements of a dual-mode receiver in accordance with an embodiment of the invention.

FIG. 2 is a high level block diagram of elements of a dual-mode receiver for DCU 110 in accordance with an embodiment of the invention. In this embodiment, a sampled and quantized RF (Radio Frequency) signal 210 passes through a Fast Fourier Transform (FFT) engine 212 for deciphering its frequency spectrum 214. The incoming signal is modulated on a particular carrier and includes a preamble followed by a data packet. Two different preambles may be used to distinguish between AM and FM signals, wherein a preamble is a data pattern, unique to each type of transmission, sent on the front of a data packet. For example an FM modulated data packet may have a unique and distinct preamble that is different from the preamble of an AM modulated data packet.

The frequency spectrum 214 of the digitized RF signal 210, at the output of the FFT engine 212, is subsequently fed into both an AM demodulator 216 and an FM demodulator 218. The demodulated information 220 from the AM demodulator 216 is bit-sliced and entered, bit-by-bit, into a correlator 222 that stores a copy of the preamble specific to the AM signal, while the demodulated information 224 from the FM demodulator 218 is bit-sliced and entered, bit-by-bit, into a correlator 226 that stores a copy of the preamble specific to the FM signal. The demodulated and bit-sliced information entering both correlators are compared with the stored preambles for a possible match. In other words, the AM and FM signals have differing preambles that permit their corresponding correlators to identify each other as a valid data signal.

In one embodiment of the invention the preambles of the AM and the FM signals may be the same, for example, to merely identify information-bearing signals. Yet, in other embodiments the preambles of the AM and the FM signals may be designed to be different for various additional considerations. For example, in an embodiment the AM and the FM signals may be orthogonal for identifying the endpoints or merely be unique for classification of the packet type (e.g. coming from a repeater or an endpoint). The preambles may even be arbitrary, or Manchester encoded for synchronization purposes.

In one embodiment the correlators may be arranged in series, illustrated in FIG. 5. In this embodiment each of the AM demodulated signal 220 and the FM demodulated signal 224 passes through both correlators 222 and 226 for identification of a valid preamble. In an alternative embodiment there may be a single correlator 222, illustrated in FIG. 6. In this embodiment both the AM demodulated signal 220 and the FM demodulated signal 224 pass through correlator 222 for identification of a valid preamble. In yet another embodiment the passage of each demodulated signal 220 or 224 through a single correlator or two series correlators, for example, can be controlled by a control signal 227 in combination with two serial memory elements 221 and 223 and a multiplexer 225, wherein the control signal 227 can be a clock signal.

Once one of the correlators 222 or 226 recognizes an input preamble as valid (appropriate AM or FM preamble), which is an indication of the existence of useful information on that particular signal carrier (e.g. data packets), the correlator provides an appropriate signal, or otherwise communicates its discovery, to a selector module 228. The selector module 228 then connects the output of the appropriate demodulator to a DSP (Digital Signal Processing) or other decoder 230 to decode the rest of the data bits of that particular information-bearing signal, until it exhausts the information bits within the data packet. The combination of the two AM and FM demodulators 216 and 218, the two correlators 222 and 226, and the selector module 228, along with their associated data paths, form a receiver "channel" 232.

The FFT engine, the decoders, the correlators, the selector, and the DSP decoder can be all or individually implemented by one or more dedicated processors, computers, programmable gate arrays, etc., or monolithically integrated on an Application Specific Integrated Circuit (ASIC). There are no limitations for the implementation methods and apparatus regarding the functions involved in this disclosure.

In another embodiment of this invention a dual mode receiver has two or more of such channels, enabling the receiver to decode AM and FM signals simultaneously. This would be helpful in a system with different endpoints, some of which employ AM transmission while others employ FM. In this embodiment the selector module of one channel may pass the demodulated data bits of an AM signal to be decoded in the DSP decoder, while the selector module of another channel passes the demodulated data bits of an FM signal to the DSP decoder.

In yet another embodiment of this invention an AM transmitting endpoint uses an ASK (Amplitude Shift Keying) modulation method or an OOK (On-Off Keying) form, and an FM transmitting endpoint uses an FSK (Amplitude Shift Keying) modulation method.

In one embodiment of the present invention, transmitting endpoints use I-Q channels to broadcast both ASK and FSK modulated signals and the receiver's AM, FM, or AM and FM demodulators demodulate the complex output of the FFT engine; however, each channel operates in the same general manner as described before. Detailed description of the ASK and FSK modulations and I-Q channels of signal transmission abounds in the literature; nevertheless, some aspects of these methods will be briefly reviewed in the following paragraphs, as they relate to the embodiments disclosed in this application.

Processing Improvement

Modulation techniques vary a parameter of a sinusoid to represent desired information. A sinusoidal wave has three parameters that can be varied: amplitude, phase and frequency. In ASK, the amplitude of the signal is changed in response to the modulating information. Bit '1' is transmitted by a signal of one particular amplitude and bit '0' by a signal of different amplitude, while keeping the frequency constant. On-Off Keying (OOK) is a special form of ASK, where one of the two amplitudes is zero. In FSK, the frequency is changed in response to information, one particular frequency for a '1' and another frequency for a '0'.

The sinusoidal carrier signals of the foregoing modulations, like any other sinusoidal waveform, can be represented as a vector whose length is the amplitude of the sine wave and its phase angle is its phase difference with a reference vector. Moreover, any vector can be written as a linear combination of orthogonal functions, called basis functions. Ideally, a minimum number of basis functions, with the following attributes, is desired for constructing a vector and forming a coordinate system:

1. each basis function has unit energy, such as (1, 0) and (0, 1) vectors; and
2. each basis function is orthogonal to all the other basis functions, represented mathematically by:

$$\int_{-\infty}^{+\infty} \phi_i(t)\phi_j(t) = \begin{cases} 1 & i = j \\ 0 & i \neq j \end{cases}$$

Figure 3:
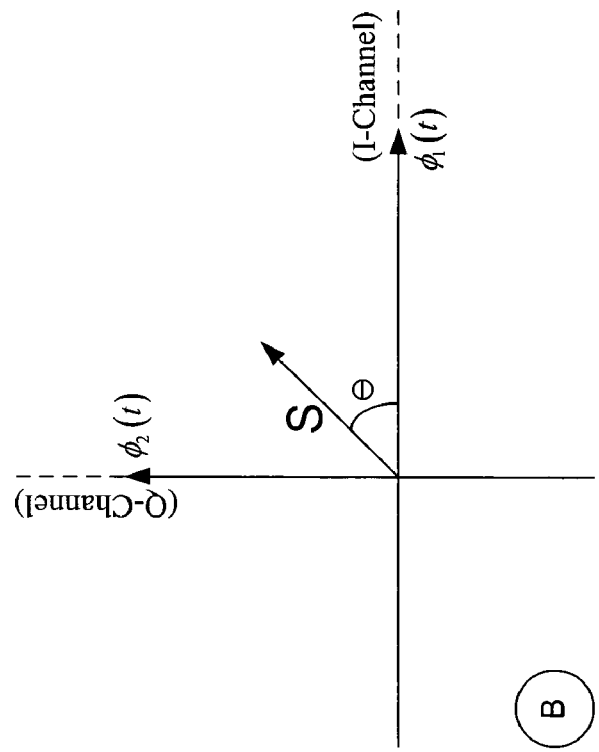
FIG. 3A is a schematic diagram of a signal presented in a Cartesian coordinate system constructed by two basis functions $\phi_1(t)$ and $\phi_2(t)$.
FIG. 3B is a schematic diagram of a signal presented in a Polar coordinate system constructed by two basis functions $\phi_1(t)$ and $\phi_2(t)$.
Figure 3:
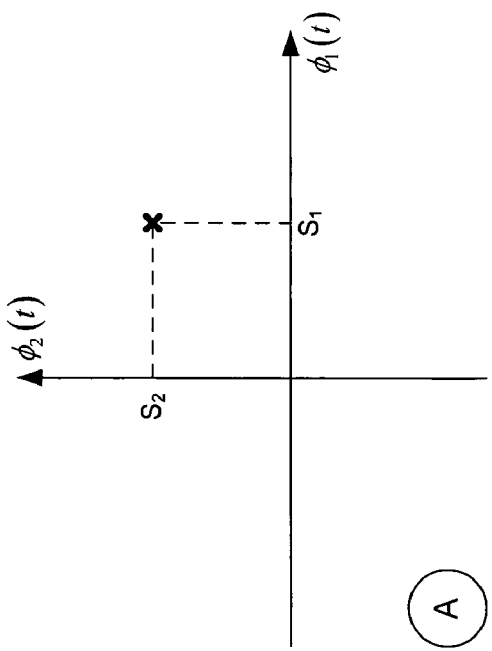

FIGS. 3A and 3B are schematic diagrams of a signal presented in a Cartesian and a polar coordinate system, respectively, constructed by two basis functions $\phi_1(t)$ and $\phi_2(t)$. One example of such set of basis functions for a sinusoidal wave is a pair of sine and cosine functions of unit amplitude. Such basis functions, which can be represented as (1, 0) and (0, 1) vectors, are used in all real and modern communication systems. The axis defined by (1, 0) vector represents the I-channel and the one defined by (0, 1) vector represents the Q-channel. In FIG. 3A, $s_1$ is the I-channel projection and $S_2$ is the Q-channel projection of the carrier signal vector.

FIG. 3B shows the same signal in polar form, with its length equal to its amplitude and its angle $\ominus$ equal to its phase difference with respect to the (1, 0) reference signal vector. The coefficients $s_1$ represent the amplitude of the I-signal and $s_2$ the amplitude of the Q-signal. These amplitudes when plotted on the x- and y-axes, respectively, form the signal vector, where Magnitude of the signal $S=(s_1^2+s_2^2)^{1/2}$
Phase of the signal $\ominus=\tan^{-1}(s_2/s_1)$ For example, if the I-channel's basis function is $\cos(\omega t)$ and the Q-channel's basis function is $\sin(\omega t)$, at any time t an I-Q sample of the non-modulated channel signals yields $s_1\cos(\omega t)$ and $s_2\sin(\omega t)$, from the I- and Q-channel respectively, from which the equation of the actual carrier signal can be written as:

$$\text{carrier signal}=s_1 \cos(\omega t)+s_2 \sin(\omega t) \quad (1)$$

Equation 1 can also be written as $$\text{carrier signal}=S[(s_1/S)\cos(\omega t)+(s_2/S)\sin(\omega t)] \quad (2)$$

And if S is such that $$S=(s_1^2+s_2^2)^{1/2} \quad (3)$$

which results in $$(s_1/S)^2+(s_2/S)^2=1 \quad (4)$$

then there will exist an angle $\ominus$ for which $$(s_1/S)=\cos(\ominus) \quad (5)$$

and $$(s_2/S)=\sin(\ominus) \quad (6)$$

Using Equations 5 and 6, the carrier signal equation can be rewritten as $$\text{carrier signal}=S[\cos(\ominus)\cos(\omega t)+\sin(\ominus)\sin(\omega t)] \quad (7)$$

and be simplified to $$\text{carrier signal}=S \cos(\omega t-\ominus) \quad (8)$$

where Equation 8 illustrates the fact that the resulting carrier signal has the same frequency as the basis functions along with a constant phase difference of $\ominus$. The FFT, data demodulation, data decoding, correlation, and data selection can all be performed in a field programmable gate array (FPGA) such as from Altera, Part No. EP1S20F484.

It is important to note that in the polar coordinate system a non-modulated sinusoidal carrier signal is simply represented by a stationary vector. This is because its amplitude remains constant as a result of being non-modulated and its phase remains constant with respect to the basis functions as a result of being a combination of the basis functions and therefore having the same frequency as the basis functions. However, any other sinusoidal signal with a different frequency than that of the basis functions (or that of the carrier signal) will be represented by a rotating vector since its phase is constantly changing with respect to the basis functions. The rotation direction of such a vector depends on whether its frequency is higher or lower than the frequency of the basis functions.

In yet another embodiment of the invention in which the transmitted signals are I-Q modulated, the proposed dual mode receiver identifies and demodulates an FM modulated signal by a mere cross-product operation which reduces the required time of the traditional demodulation by a factor of more than forty (40). As described above, the frequency deviation of an FM modulated signal from the carrier frequency manifests itself as a frequency of rotation around the origin of the polar plot, where a clockwise or a counter-clockwise rotation may be defined as a '0' or a '1'. Therefore, data is decoded by calculating the frequency of the I-Q phasor rotation, which is the phase change divided by the elapsed time. The phase change itself is:

$$\tan^{-1}[(\text{change in Q})/(\text{change in I})] \quad (9)$$

Since new I and Q values are obtained at each sampling instance and the time between the samples are known, the phase change and the deviation frequency can be calculated to determine whether the received data presents a logic '0' or a logic '1'.

Therefore, rate of rotation of the phasor will reflect a new input frequency and will produce a different angular change between incoming samples. By taking the difference between subsequent angle calculations, frequency changes can be detected, which provides a means for decoding the FM data. FM decoding has been done using an FFT by setting the deviation wide enough that as the carrier deviates it travels from one bin to the other. The decoder then decodes the data by monitoring the excursions in and out of the bin pairs. This requires either very narrow bins or wide deviation. Another method of FM decoding is to set the bin edge close to the carrier center frequency so that the amplitude in one bin changes as the carrier deviates in and out of the bin. By using I and Q vectors the deviation can be decoded when the carrier is anywhere within the bin. Bench testing has shown improvements in receiver sensitivity using FM modulation over AM.

Traditionally a CORDIC (COordinate Rotation Digital Computer) algorithm is employed for calculating trigonometric functions. A CORDIC algorithm is an iterative method that requires no multiplications and is particularly suited for hardware implementation. However, if merely the direction of the rotation of a signal vector is required to identify a frequency deviation and demodulate a signal, the CORDIC calculations, or for that matter any other calculation for obtaining deviation frequency, will be a waste of time and resources.

After each sampling, in this embodiment of the invention, the cross-product of the sampled I-Q phasor and its preceding I-Q phasor is calculated. At each sampling, the generated I-Q phasor is of the form $\alpha i+\beta q$, where i is a unit vector in the I-direction, q is a unit vector in the Q-direction, $\alpha$ is the I-channel sample value, $\beta$ is the Q-channel sample value, and $i \times q = p$, where p is a unit vector perpendicular to the I-Q plane and coming out of it toward the observer. Since the cross-product operation is not commutative, and $A \times B = -B \times A$, a change of direction in the deviation rotation of the I-Q phasor results in a change in the sign of the computed cross-product. For example, for a clockwise deviation rotation the value of the cross product of a sampled I-Q phasor with its preceding I-Q phasor sample will be a positive number:

(sampled I-Q phasor)×(preceding I-Q phasor sample) >0, while the cross-product for a counter-clockwise rotation yields a negative number. Thus, the received data can be demodulated by merely calculating the above mentioned cross-product and observing its sign.

In addition to simplification of the computations, the cross-product of two consecutive I-Q samples provides both the FM demodulation and the digital slicing of the received data in one operation. Moreover, the cross-product proposed in this embodiment takes only three (3) machine cycles and directly provides a logic '1' or a logic '0', while the CORDIC method of calculating the deviation frequency takes approximately 140 machine cycles and requires further decision-making cycles to decipher the logic value of the received signal.

Figure 4:
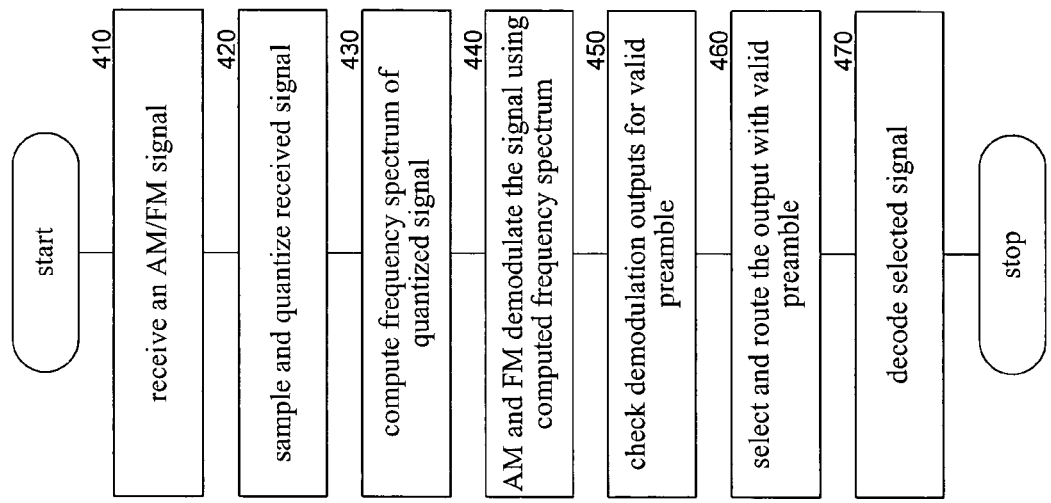
FIG. 4 is a flow diagram of an example of steps involved in decoding an AM-FM AMR signal.

FIG. 4 is a flow diagram representing an example of steps involved in decoding an AM/FM AMR signal. At block 410, an AM/FM signal is received by a receiver. At block 420, the receiver samples and quantizes the signal. At block 430, a frequency spectrum of the quantized signal is computed. At block 440, separate AM and FM demodulators demodulate the received signal, using the computed frequency spectrum. At block 450, the outputs of both the AM and the FM demodulators are checked for one of at least two valid preambles. At block 460, a selector selects and routes, to a decoder, the output with a valid preamble. At block 470, the decoder decodes the routed demodulated signal.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the utility data collection system described above. The elements and acts of the various embodiments described above can be combined to provide further embodiments.

All of the above patents and applications and other references, including any that may be listed in accompanying filing papers, as well as the International PCT Patent Application No. PCT/US05/11205, entitled "Frequency Shift Compensation, Such As for Use in a Wireless Utility Meter Reading Environment," filed Mar. 30, 2005, assigned to Itron, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the compensation system described above may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. In a utility meter reading system having multiple utility meters wirelessly transmitting utility meter data to a data collection unit, a data collection system comprising:

a utility data encoder-transmitter connected to each of the utility meters, wherein the encoder-transmitter is configured to wirelessly transmit AM or FM utility metering data, wherein the transmitted AM or FM utility metering data includes differing AM or FM preambles, respectively; and a data collection unit comprising a dual-mode receiver configured to demodulate and decode the wirelessly transmitted AM, FM, or AM and FM utility metering data signal, wherein the mobile data collection unit is configured to:

receive the transmitted AM or FM signal;

sample and quantize the received signal;

compute a frequency spectrum from the received signal;

demodulate the received signal by both an AM demodulator and an FM demodulator that both use the computed frequency spectrum;

check both demodulated signals for either the AM preamble or the FM preamble;

select and route the demodulated signal having either the AM preamble or the FM preamble to be decoded in a decoder; and decode the routed demodulated signal.

2. The system of claim 1, wherein the encoder-transmitter transmits ASK, FSK, or ASK and FSK modulated signal types, and wherein the data collection unit is mobile.

3. The system of claim 1, wherein an FFT (Fast Fourier Transform) engine computes the frequency spectrum.

4. The system of claim 1, wherein the AM demodulator and the FM demodulator demodulate the received signal substantially simultaneously.

5. The system of claim 1, wherein a correlator checks the demodulated signal from the AM demodulator for a first preamble and another correlator checks the demodulated signal from the FM demodulator for a second preamble, and wherein the first and the second preambles are orthogonal.

6. The system of claim 1, wherein a DSP (Digital Signal Processing) facility decodes the routed demodulated signal.

7. The system of claim 1, wherein the AM and FM demodulators bit slice and output demodulated data bit-by-bit.

8. The system of claim 1, wherein demodulating the received signal comprises calculating a cross-product of a carrier signal phasor, computed from IQ channel samples, with a carrier signal phasor, computed from preceding IQ channel samples.

9. The system of claim 1, wherein data signals are ASK and/or FSK modulated, and wherein demodulating FSK modulated data comprises calculating a cross-product of a carrier signal phasor computed from most recent IQ channel samples with a carrier signal phasor computed from IQ channel samples immediately preceding the most recent samples, and wherein a change in the calculated cross-product indicates a change in modulating logic level from a '1' to a '0' or from '1' to a '0'.

10. In a wireless data communication system, an apparatus comprising:

a dual-mode receiver configured to:

receive data signals from at least one transmitter unit;

sample the received data signal;

transform the sampled signal into frequency components;

demodulate the sampled signal by an AM and FM demodulator utilizing the frequency components;

analyze preambles of the demodulator output to identify information-bearing AM and FM signals;

select and route demodulated signals according to the analyzed preambles; and decode the selected and routed demodulated signal.

11. The apparatus of claim 10, wherein frequency components are computed by a Fast Fourier Transform (FFT) facility.

12. The apparatus of claim 10, wherein the AM demodulator and the FM demodulator demodulate the signal substantially simultaneously and the two demodulation outputs are analyzed by two correlators working in parallel or in series.

13. The apparatus of claim 10, wherein all functions are implemented by general purpose processors, dedicated processors, computers, programmable gate arrays, or a combination thereof.

14. The apparatus of claim 10, wherein demodulated signals are routed to the decoder by a selector module based on information received from preamble correlators.

15. The apparatus of claim 10, wherein demodulated signals are decoded by a Digital Signal Processing (DSP) facility.

16. The apparatus of claim 10, wherein the FM demodulation of the signal comprises computing a cross-product of two consecutive instances of carrier signal phasors.

17. A dual-mode AM-FM decoding method comprising:

receiving at least one data signal from at least one of multiple transmitter units, wherein the received data signal is either an AM signal or an FM signal;

sampling the received data signal;

transforming the sampled signal into its frequency components;

AM and FM demodulating the signal utilizing the signal frequency components;

identifying information-bearing demodulated signals;

selecting and routing the information-bearing signals to a decoder; and decoding the selected signals.

18. The dual-mode AM-FM decoding method of claim 17, wherein demodulating the signal comprises ASK and FSK demodulation in parallel, and wherein the FSK demodulation comprises calculating a cross-product of a carrier signal phasor computed from a most recent IQ channel sample with a carrier signal phasor computed from an IQ channel sample immediately preceding the most recent sample, and wherein a change in the calculated cross-product indicates a change in the modulating logic level, from a binary '1' to a '0' or from a '0' to a '1'.

19. The dual-mode AM-FM decoding method of claim 17, wherein selecting and routing the information-bearing signals comprises correlating the demodulated AM signal with an AM preamble and the demodulated FM signal with an FM preamble and selecting a signal which has matching preamble based on outputs of the correlators, and wherein decoding the selected and routed signals comprises decoding by a DSP (Digital Signal Processing) facility.

20. A wireless data acquiring system, comprising:

a means for receiving at least one data signal from at least one of multiple transmitter units, wherein the received data signal is either an AM or an FM signal;

a means for sampling the received signal;

a means for transforming the sampled signal into frequency components;

a means for AM and FM demodulating the signal utilizing the frequency components;

a means for identifying information-bearing demodulated signals;

a means for selecting and routing information-bearing signals to a decoder; and a means for decoding the selected signals.

21. An apparatus for use with a data acquiring system, the apparatus comprising:
- a fast Fourier transformer to convert a received signal into frequency components, wherein the received signal is either an AM or an FM signal having distinguishing portions;
- an AM demodulator, coupled with the fast Fourier transformer, to demodulate the received signal utilizing the signal frequency components;
- an FM demodulator, coupled with the fast Fourier transformer, to demodulate the received signal utilizing the signal frequency components;
- at least one correlator, coupled with the AM demodulator and with the FM demodulator, to identify whether the received signal is an information-bearing signal based on the distinguishing portion of the received signal; and
- a selector to select and route an output from the AM demodulator or the FM demodulator based on the identified distinguishing portion of the received signal.

22. The apparatus of claim 21, wherein the distinguishing portions of the AM signal and the FM signal are different.

23. The apparatus of claim 21, wherein the distinguishing portions of the AM signal and the FM signal are unique and orthogonal preambles.

24. The apparatus of claim 21, wherein the distinguishing portions of the AM signal and the FM signal are identical.

25. A dual-mode wireless data acquisition apparatus comprising:
- a signal processing system configured to receive frequency components of a first signal, a second signal, or a combination of the first and the second signal, and further configured to:
  - demodulate, in parallel, the first and the second signals, utilizing the frequency domain components of the first and the second signals;
  - validate one of two preambles of the first and the second demodulated signals; and
  - identify for further processing the first or second demodulated signal based on which of the two preambles is valid.

26. The apparatus of claim 25, wherein two parallel correlators validate the preambles to identify valid signals, and wherein the valid signals are routed to a decoder by a selector module operating based on information received from the two correlators, and wherein the preambles are either the same, orthogonal, arbitrary, or Manchester coded.

27. The apparatus of claim 25, wherein demodulating the signal comprises ASK and FSK demodulation in parallel, and wherein the FSK demodulation comprises calculating a cross-product of a carrier signal phasor computed from a most recent I-Q channel sample with a carrier signal phasor computed from an I-Q channel sample immediately preceding the most recent sample, and wherein a change in the calculated cross-product indicates a change in the modulating logic level, from a binary '1' to a '0' or from a '0' to a '1'.

28. The apparatus of claim 1, wherein a single correlator or two correlators in series validate the preambles to identify valid signals, and wherein the valid signals are routed to a decoder by a selector module.

* * * * *

UNITED STATES PATENT AND TRADEMARK OFFICE
CERTIFICATE OF CORRECTION

PATENT NO.        : 7,400,904 B2
APPLICATION NO.   : 11/096269
DATED             : July 15, 2008
INVENTOR(S)       : Cornwall et al.

It is certified that error appears in the above-identified patent and that said Letters Patent is hereby corrected as shown below:

In column 2, line 51, delete "ERTS)," and insert -- ERTs), --, therefor.

In column 5, line 31, delete "$S_2$" and insert -- $s_2$ --, therefor.

In column 5, line 52, after "($\omega$t)]" insert -- . --.

In column 5, line 53, before "And" delete "s".

In column 5, line 57, after "=1" insert -- , --.

In column 5, line 63, after "sin($\ominus$)" insert -- . --.

In column 6, line 3, after "cos($\omega$t-$\ominus$)" insert -- , --.

In column 6, line 38, after "(change in I)]" insert -- . --.

In column 6, line 61-62, delete "(COrdinate Rotation Digital computer)" and insert -- (COrdinate Rotation DIgital computer) --, therefor.

In column 8, line 26, after "Itron," insert -- (Attorney Docket No. 10145-8013WO), --.

In column 9, line 41, in Claim 8, delete "IQ" and insert -- I-Q --, therefor.

In column 9, line 42, in Claim 8, delete "IQ" and insert -- I-Q --, therefor.

In column 9, line 47, in Claim 9, delete "IQ" and insert -- I-Q --, therefor.

In column 9, line 48, in Claim 9, delete "IQ" and insert -- I-Q --, therefor.

UNITED STATES PATENT AND TRADEMARK OFFICE
CERTIFICATE OF CORRECTION

PATENT NO.       : 7,400,904 B2
APPLICATION NO.  : 11/096269
DATED            : July 15, 2008
INVENTOR(S)      : Cornwall et al.

It is certified that error appears in the above-identified patent and that said Letters Patent is hereby corrected as shown below:

In column 9, line 52, in Claim 9, delete "'1' to a '0'." and insert -- a '0' to a '1'. --, therefor.

In column 12, line 26, in Claim 28, delete "claim 1," and insert -- claim 25, --, therefor.

Signed and Sealed this

Sixteenth Day of September, 2008

JON W. DUDAS
*Director of the United States Patent and Trademark Office*